(12) United States Patent
Pan et al.

(10) Patent No.: US 7,508,569 B2
(45) Date of Patent: Mar. 24, 2009

(54) LOW VOLTAGE MICRO MECHANICAL DEVICE

(75) Inventors: Shaoher X. Pan, San Jose, CA (US); Tore Nauta, Menlo Park, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 210 days.

(21) Appl. No.: 11/557,769

(22) Filed: Nov. 8, 2006

(65) Prior Publication Data
US 2008/0122822 A1     May 29, 2008

(51) Int. Cl.
*G02B 26/00* (2006.01)
(52) U.S. Cl. ...................................... 359/290
(58) Field of Classification Search ................. 359/290, 359/291, 292, 293, 295, 298, 220, 223, 224, 359/237, 282, 286, 289, 320, 322, 323, 324
See application file for complete search history.

(56) References Cited

U.S. PATENT DOCUMENTS

| 5,061,049 | A | | 10/1991 | Hornbeck |
| 5,142,405 | A | | 8/1992 | Hornbeck |
| 5,280,277 | A | * | 1/1994 | Hornbeck ................... 345/108 |
| 5,331,454 | A | | 7/1994 | Hornbeck |
| 5,382,961 | A | | 1/1995 | Gale, Jr. |
| 5,838,484 | A | * | 11/1998 | Goossen ................... 359/282 |
| 6,992,810 | B2 | | 1/2006 | Pan et al. |
| 2005/0128564 | A1 | | 6/2005 | Pan |

\* cited by examiner

*Primary Examiner*—Scott J Sugarman
*Assistant Examiner*—Tuyen Q Tra
(74) *Attorney, Agent, or Firm*—Fish & Richardson P.C.

(57) ABSTRACT

Methods for driving a plurality of MEMS devices in an apparatus are described. A voltage pulse is applied to an electrode or a structure portion of a MEMS device. The electrode is on the substrate underneath the structure portion. At least two MEMS devices of the plurality of MEMS devices have different threshold voltages, and the threshold voltage is the minimum voltage required to move the structure portion. A bias voltage is applied to whichever of the electrode or the structure portion of the MEMS device does not have the voltage pulse applied thereto. The bias voltage and the voltage pulse are capable of moving the structure portion of the MEMS device that has the higher threshold voltage of the different threshold voltages.

34 Claims, 12 Drawing Sheets

LOW VOLTAGE MICRO MECHANICAL DEVICE

BACKGROUND

The present disclosure relates to micro mechanical devices ("MEMS").

A micro mirror is a micro mechanical device. A micro mirror can include a mirror plate that can tilt to different positions. The tilt movement of the mirror plate can be driven by electrostatic forces that can be generated by electric potential differences between a mirror plate and an electrode over the substrate underneath the mirror plate. The mirror plate can be tilted to an "on" position and an "off" position. In the "on" position, the mirror plate can direct an incident light to produce an image pixel of a display image. In the "off" position, the mirror plate can direct the incident light away from the display image. The mirror plate can be stopped by a mechanical stop at a well defined position. A spatial light modulator (SLM) can include an array of micro mirrors that can be selectively tilted to project incident light to produce image pixels in a display image.

SUMMARY

In one general aspect, the present specification relates to an apparatus including a plurality of micro-mechanical devices, each of which includes a first structure portion over a substrate and a second structure portion in connection with the first structure portion. The second structure portion comprises a conductive portion, wherein the second structure portion is configured to move in response to a voltage pulse and a bias voltage. An electrode is over the substrate and under the conductive portion of the second structure portion. The apparatus also includes a first electric circuit configured to apply the voltage pulse having a pulse amplitude either to the electrode or the second structure portion of at least one micro-mechanical device of the plurality of micro-mechanical devices and a second electric circuit configured to apply the bias voltage to the plurality of micro-mechanical devices, wherein the bias voltage is applied to whichever of the electrode or the second structure portion of the at least one micro-mechanical device does not have the voltage pulse applied thereto in the step of applying the voltage pulse. At least two micro-mechanical devices of the plurality of micro-mechanical devices have different threshold amplitudes, each threshold amplitude being a minimum voltage of the voltage pulse having the pulse amplitude are capable of moving the second structure portion of the micro-mechanical device that has the higher threshold amplitude of the different threshold amplitudes.

In another general aspect, the present specification relates to a method for driving a plurality of micro-mechanical devices in an apparatus. The method includes applying a voltage pulse having a pulse amplitude either to an electrode or a first structure portion of at least one micro-mechanical device of the plurality of micro-mechanical devices. The first structure portion is connected to a second structure portion on a substrate and the electrode is on the substrate underneath the first structure portion. A bias voltage is applied to the plurality of micro-mechanical devices, wherein the bias voltage is applied to whichever of the electrode or the first structure portion of the at least one micro-mechanical device does not have the voltage pulse applied thereto in the step of applying the voltage pulse. At least two micro-mechanical devices of the plurality of micro-mechanical devices have different threshold amplitudes, each threshold amplitude being a minimum voltage of the voltage pulse required to move the first structure portion in conjunction with the bias voltage. The bias voltage and the voltage pulse having the pulse amplitude are capable of moving the first structure portion of the micro-mechanical device that has the higher threshold amplitude of the different threshold amplitudes.

In another general aspect, the present specification relates to a method for selecting a bias voltage for addressing an array of micro-mechanical devices. The method includes applying a voltage pulse either to an electrode or to a first structure portion of at least one micro-mechanical device, wherein the first structure portion is connected to a second structure portion on a substrate and the electrode is on the substrate underneath the first structure portion. A bias voltage is applied to whichever of the electrode or the first structure portion of the micro-mechanical device does not have the voltage pulse applied thereto in the step of applying the voltage pulse. The bias voltage is varied to determine a threshold bias voltage of the micro-mechanical device, the threshold bias voltage being a minimum bias voltage that causes the movement of the first structure portion of the micro-mechanical device in conjunction with the applied voltage pulse. The varying step is repeated for each of the micro-mechanical devices to determine threshold bias voltages for each of the micro-mechanical devices in the array. An addressing voltage for the bias voltage is selected that is about equal to or at a predetermined value above the maximum threshold bias voltage of the threshold bias voltages for the micro-mechanical devices.

In another general aspect, the present specification relates to a method for selecting a amplitude for a voltage pulse for addressing an array of micro-mechanical devices. The method includes applying a bias voltage either to an electrode or to a first structure portion of at least one micro-mechanical device of the array of micro-mechanical devices, wherein the first structure portion is connected to a second structure portion on a substrate and the electrode is on the substrate underneath the first structure portion. A voltage pulse is applied to whichever of the electrode or to the first structure portion of the micro-mechanical device does not have the bias voltage applied thereto in the step of applying the bias voltage. The amplitude of the voltage pulse is varied to determine a threshold amplitude of the voltage pulse, the threshold amplitude being a minimum voltage of the voltage pulse that causes the movement of at least a portion of the first structure portion of the micro-mechanical device in conjunction with the applied bias voltage. The varying step is repeated for each of the micro-mechanical devices to determine threshold amplitude of the voltage pulse for each micro-mechanical device in the array. An addressing amplitude is selected for the voltage pulse that is about equal to at a predetermined value above a maximum threshold amplitude of the voltage pulse for the micro-mechanical devices.

Implementations of the system may include one or more of the following. The voltage of the voltage pulse can be selected to be about equal to, or 0.1 V or 5% higher than the higher threshold amplitude of the different threshold amplitudes. The first electric circuit can be configured to apply the bias voltage to the conductive portion of the second structure portion and the second electric circuit can be configured to apply the voltage pulse to the electrode in the at least one micro-mechanical device. The first electric circuit can be configured to apply the bias voltage to the electrode and the second electric circuit can be configured to apply the voltage pulse to the conductive portion of the second structure portion in the at least one micro-mechanical device. The bias voltage can have a first electric polarity and the voltage pulse can have a second electric polarity opposite to the first electric polarity. The bias voltage and at least a portion of the voltage pulse can have the same electric polarity. The bias voltage can have a duration that encompasses a plurality of the voltage pulses. The apparatus can further include a mechanical stop configured to contact the second structure portion to stop the movement of the second structure portion in the at least one micromechanical device. The second structure portion can include a reflective upper surface. The apparatus can further include a memory device connected to the first electric circuit and the second electric circuit, wherein the memory device is configured to store the bias voltage and the amplitude of the voltage pulse. The predetermined value can be 1%, 5%, 10%, 20%, 30%, 40%, 50%, 0.1V, 0.5 V, 1.V, 2 V, 5 V, 10 V or 15 V above the maximum threshold bias voltage. The addressing voltage can be within 1%, 5%, 10%, 20%, 30%, 40%, 50%, 0.1 V, 0.5 V, or 1 V, 2 V, 5 V, 10 V or 15 V of the threshold bias voltage. The addressing amplitude can be within 1%, 5%, 10%, 20%, 30%, 40%, 50%, 0.1V, 0.5 V, 1 V, 2 V, 5 V, 10 V or 15 V of the threshold amplitude. The micro-mechanical devices can include all the micro-mechanical devices in the array. The bias voltage can be applied to the first structure portion and the voltage pulse can be applied to the electrode. The bias voltage can be applied to the electrode and the voltage pulse can be applied to the first structure portion. The bias voltage can have a first polarity and the voltage pulse can have a second polarity opposite to the first polarity or the bias voltage and the voltage pulse can have a same polarity. The first structure portion can include a lower conductive surface. The first structure portion can include a reflective upper surface.

Implementations may include one or more of the following advantages. A bias voltage can be provided to a micro mechanical device such that the micro mechanical device can be driven by a voltage pulse having a smaller amplitude than the voltage pulse required in the absence of the bias voltage. A wider variety of types of circuits can be used with the device. Additionally, the circuit for the driving voltage pulse can be simplified. The tiltable mirror plate in each of the micro mirrors of a spatial light modulator can be tilted by an electrostatic force produced by an electric potential difference between the mirror plate and an electrode on a substrate. By applying a bias voltage to the mirror plate, a voltage pulse applied to tilt the mirror plate can have a lower peak voltage than that in the absence of the bias voltage. The circuit for the driving voltage pulse can thus be simplified.

Although the specification has been particularly shown and described with reference to multiple embodiments, it will be understood by persons skilled in the relevant art that various changes in form and details can be made therein without departing from the spirit and scope of the specification.

BRIEF DESCRIPTION OF THE DRAWINGS

The following drawings, which are incorporated in and from a part of the specification, illustrate embodiments of the present specification and, together with the description, serve to explain the principles of the specification.

DETAILED DESCRIPTION

Figure 1:
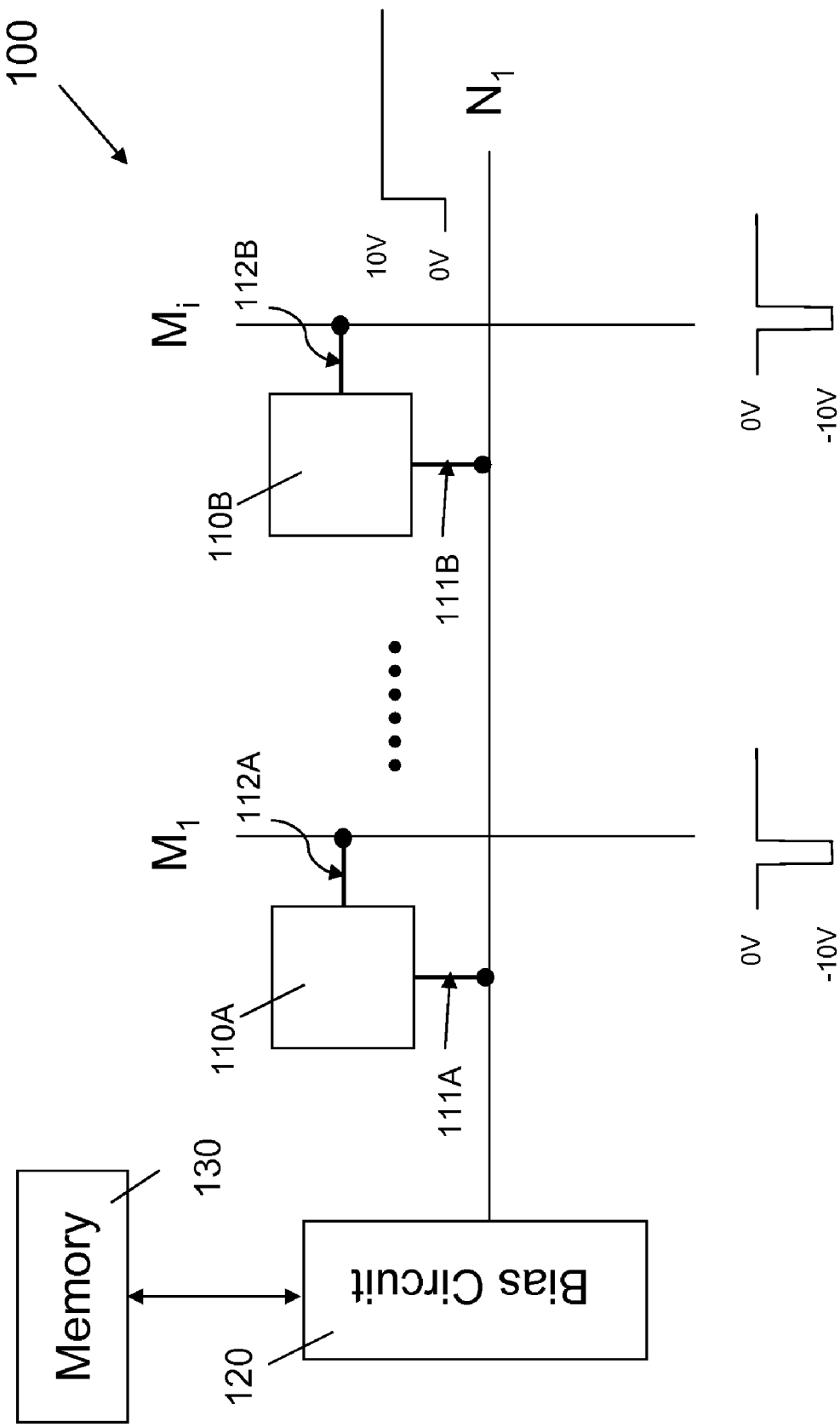
FIG. 1 illustrates a connection diagram of an apparatus, including a plurality of low voltage MEMS devices.

FIG. 1 illustrates a connection diagram of an apparatus 100 comprising a plurality of low voltage MEMS devices 110A-110B. The low voltage MEMS devices 110A-110B can be addressed and driven by an electrically conductive word line $N_1$, a plurality of electrically conductive bit lines $M_1$ and $M_i$, and a bias circuit 120. A memory 130 can store values of a bias voltage, and an amplitude and a duration of the voltage pulse for addressing the low voltage MEMS devices 110A-110B. The memory 130 is connected with the bias circuit 120 and other addressing or control electric circuit in the apparatus 100. The memory 130 can be a separate device or a component of an integrated device that also includes the bias circuit 120 and other addressing or control electric circuit in the apparatus 100. The low voltage MEMS devices 110A-110B can be arranged in a matrix having a plurality of rows and columns. The low voltage MEMS devices 110A-110B are connected with the word line $N_1$ through electric interconnects 111A-111B. Each low voltage MEMS device 110A-110B is also connected with at least one bit line $M_1$ or $M_i$ respectively by electrical interconnects 112A-112B.

Figure 2A:
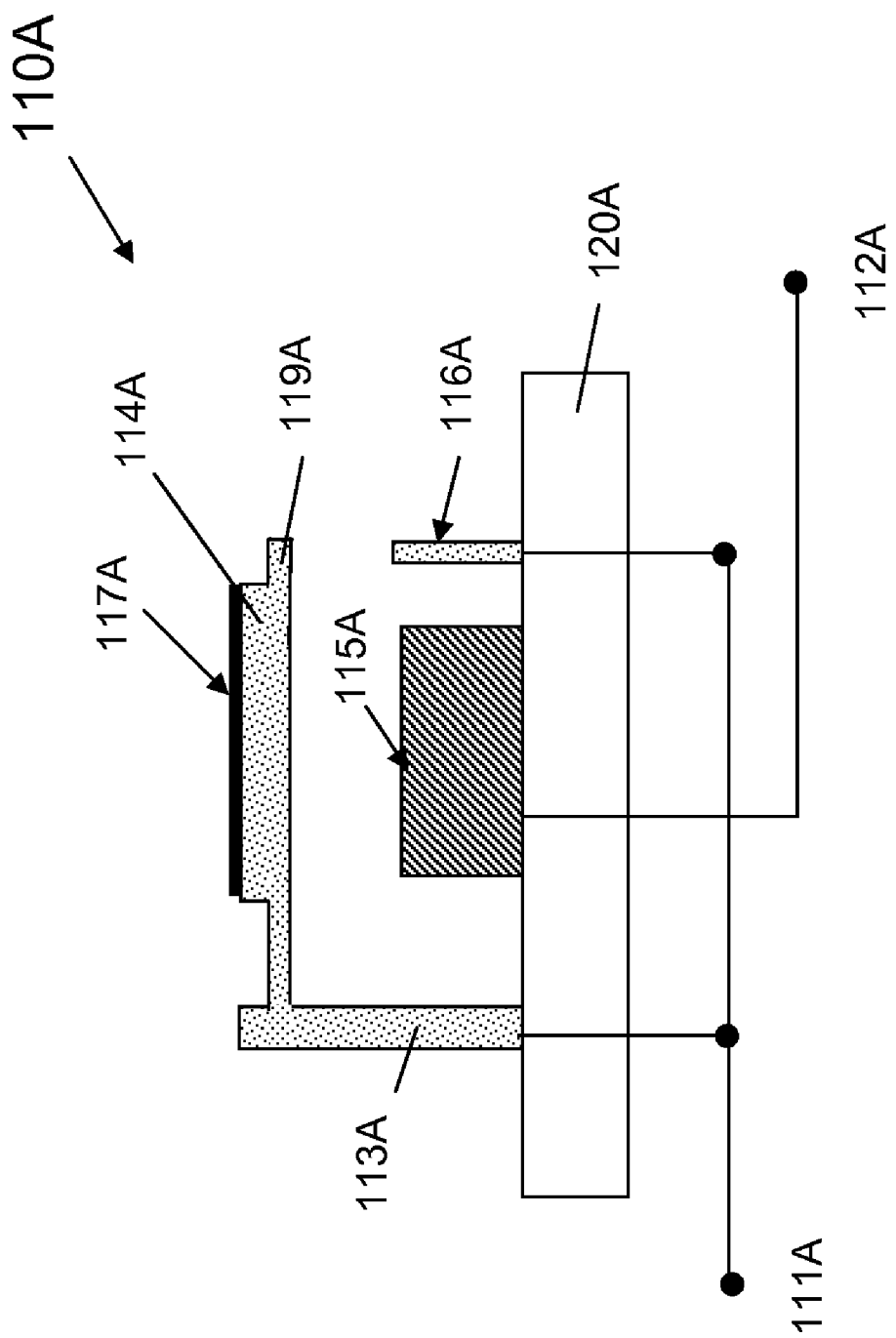
FIG. 2A illustrates a cross-sectional view of an exemplified low voltage MEMS device.
Figure 2B:
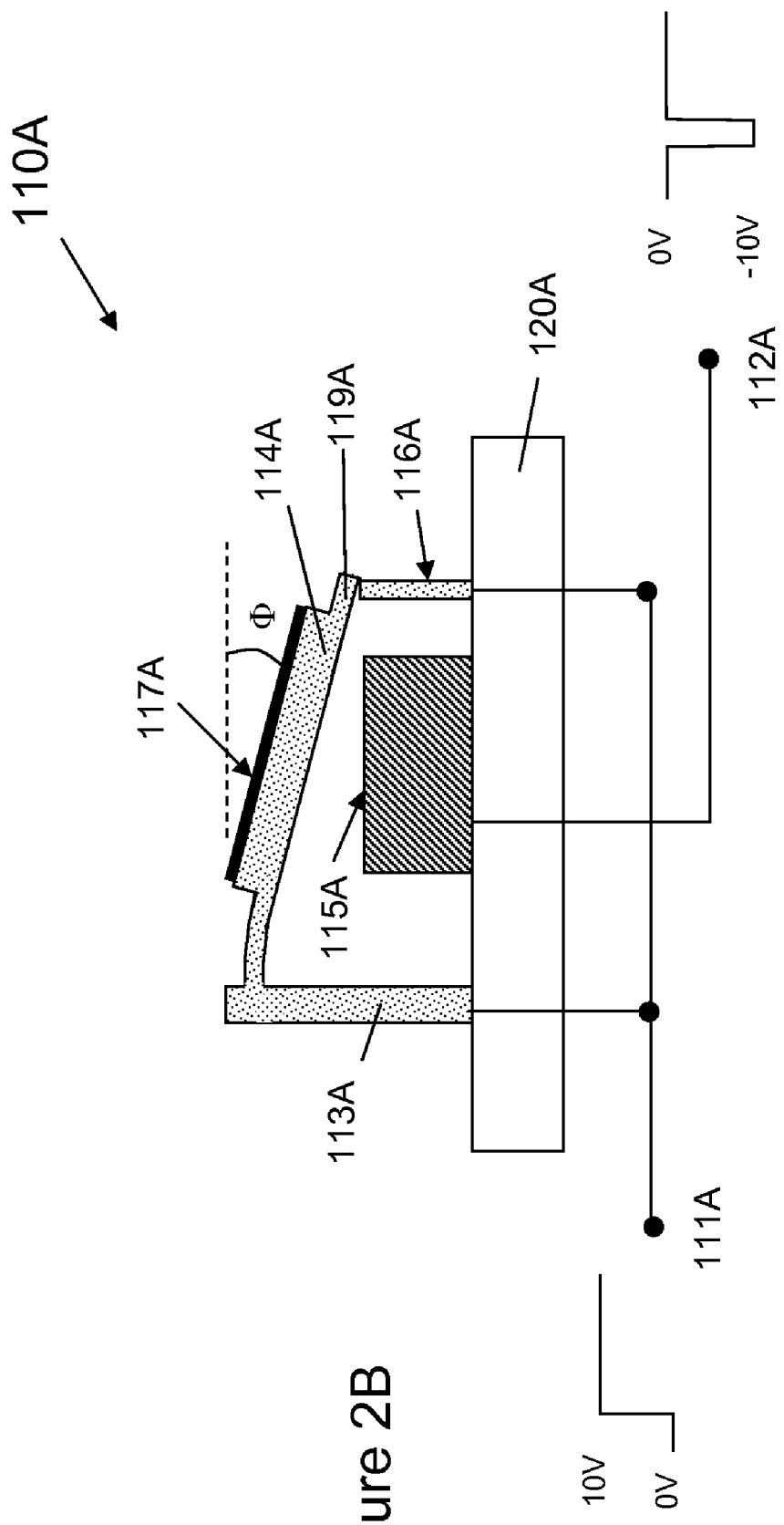
FIG. 2B illustrates a cross-sectional view of the low voltage MEMS device of FIG. 2A when the low voltage MEMS device is actuated by an addressing voltage pulse under a bias voltage.

FIG. 2A illustrates a cross-sectional view of an exemplary device for one of the low voltage MEMS devices, e.g., device 110A (other devices in the matrix such as device 110B can be constructed similarly). The low voltage MEMS device 110A includes a substrate 120A, a post 113A, a cantilever 114A, and an electrode 115A on the substrate 120A. The electrode 115A can include multiple steps (not shown) such that the electrode 115A can be kept close to the lower surface of the cantilever 114A when the cantilever 114A is bent toward the electrode 115A, as shown in FIG. 2B. The low voltage MEMS device 110A also includes a mechanical stop 116A on the substrate 120A. The mechanical stop 116A can have an elongated shape pointing upward toward the lower surface of the cantilever 114A. The cantilever 114A can include a tip 119A over the mechanical stop 116A. The cantilever 114A can include a reflective upper surface 117A.

The post 113A and the mechanical stop 116A are electrically conductive. In some embodiments, the post 113A and the mechanical stop 116A are electrically connected with the word line $N_1$ via the interconnect 111A. At least a portion of the cantilever 114A is electrically connective and is connected with the post 113A. Thus, the mechanical stop 116A is kept at substantially the same electric potential as the conductive portion of the cantilever 114A. The electrode 115A is electrically connected with the bit line $M_1$ via the interconnect 112A.

FIG. 2B illustrates a cross-sectional view of the low voltage MEMS device 110A. A positive bias voltage is applied to the cantilever 114A and the mechanical stop 116A from the word line $N_1$ via the electric interconnect 111A. A negative voltage pulse is applied to the electrode 115A from the bit line $M_1$ via the electric interconnect 112A. The magnitude of the peak voltage of the voltage pulse can also be called "addressing voltage". For example, the bias voltage can be +10V. The peak voltage of the negative voltage pulse can be −10V. The opposite electric potentials between the cantilever 114A and the electrode 115A can create an attractive electrostatic force between the cantilever 114A and the electrode 115A to cause the cantilever 114A to bend downward toward the electrode 115A. The downward movement of the cantilever 114A is stopped when tip 199A comes into contact with the upper tip of the mechanical stop 116A. The tip 119A is slightly bent under the electrostatic force. The restoring force can allow the cantilever 114A to easily separate from the mechanical stop 116A after the voltage signal is decreased or removed. Because the mechanical stop 116A is kept at the same electric potential as the cantilever 114A, the electric potential of the cantilever 114A is not altered when it is in contact with the mechanical stop 116A, as described above.

The mechanical stop 116A can stop the cantilever 114A at a maximum and precisely defined angle. The deflection angle "Φ" of the cantilever 114A reaches its maximum when the cantilever 114A is stopped by the mechanical stop 116A, that is, when the cantilever 114A and the mechanical stop 116 come into contact with each other. A precise angle of deflection can be desirable when the cantilever is used to deflect light to a specific location. Incident light can be reflected by the reflective upper surface 117A. The direction of the reflected light can vary as the cantilever 114A changes its orientation. For example, the incident light can be deflected to one direction when the cantilever 114A is stopped by the mechanical stop 116A at the maximum deflection angle. The incident light can be deflected to another direction when the cantilever 114A is in a quiescent state or substantially horizontal direction.

It should be noted that the polarity of the bias voltage applied to the interconnect 111A and the voltage pulses applied to the electric interconnect 112A can be changed. For example, the bias voltage applied to the electric interconnect 111A can be −10V. The electric voltage applied to the electric interconnect 112A be a +10V peak voltage. In addition, a voltage pulse having the same polarity as the polarity of the bias voltage can be applied to push the cantilever 114A away from the mechanical stop 116.

Figure 3:
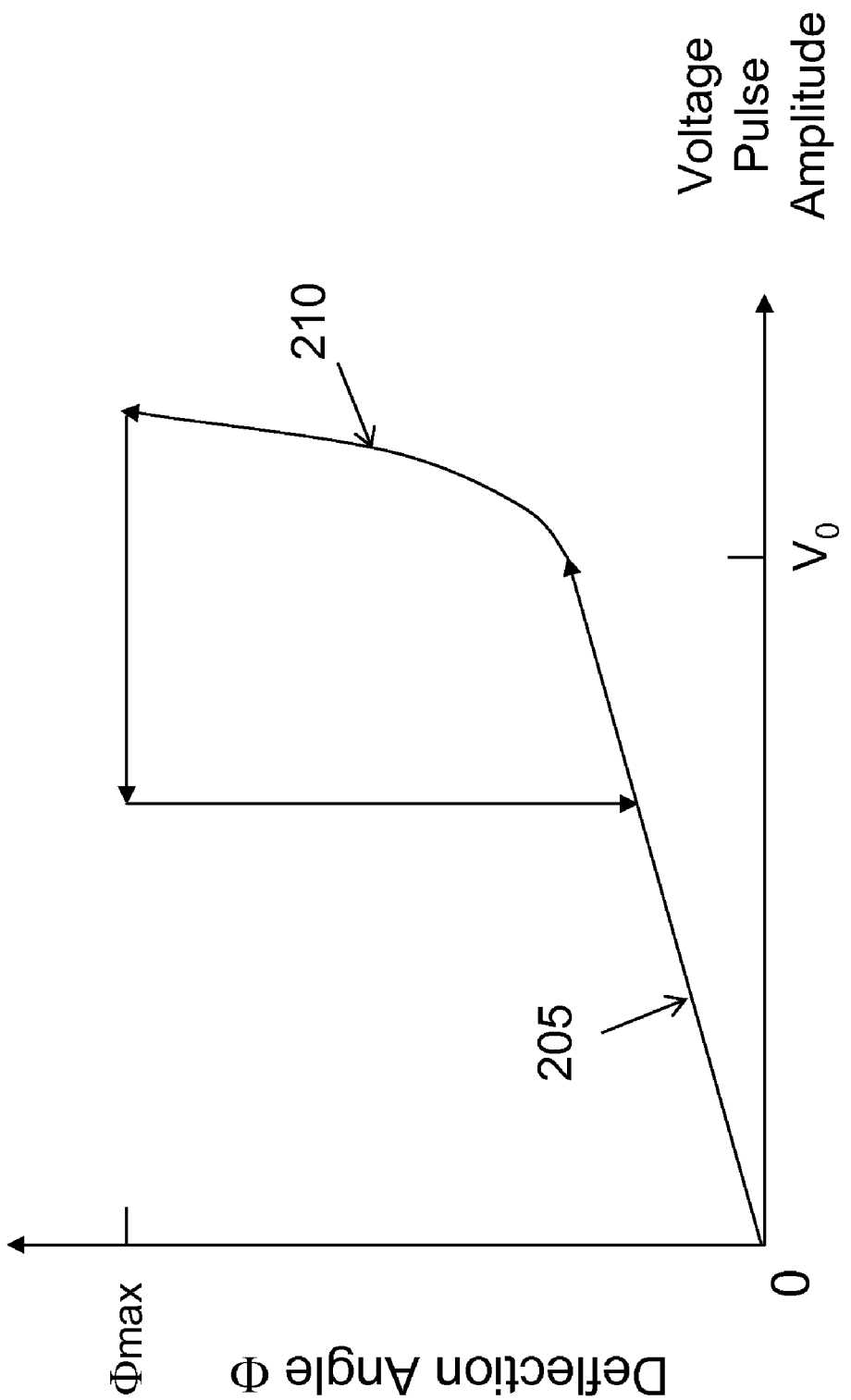
FIG. 3 illustrates the deflection angle of a low voltage MEMS device as a function of the addressing voltage in the absence of a bias voltage.

FIG. 3 illustrates a typical response of the deflection angle "Φ" of the low voltage MEMS device 110A (or 110B) as a function of the amplitude of the voltage pulse in the absence of a bias voltage. As the amplitude of the voltage pulse is increased, the cantilever 114A experiences an increased attractive electrostatic force toward the electrode 115A. The deflection angle initially increases along a response curve 205. When the amplitude of the voltage pulse reaches a threshold amplitude $V_0$ of the voltage pulse (i.e., the minimum amplitude to cause actuation) the deflection angle begins to increase along a rapid response curve 210 until the deflection angle reaches the maximum deflection angle $\Phi_{max}$ when the cantilever 114A contacts the mechanical stop 116A.

As the amplitude of the voltage pulse is decreased, the cantilever 114A can initially stay at the maximum deflection angle $\Phi_{max}$ before it decreases to the response curve 205 due to the stiction to the mechanical stop 116A.

Figure 4:
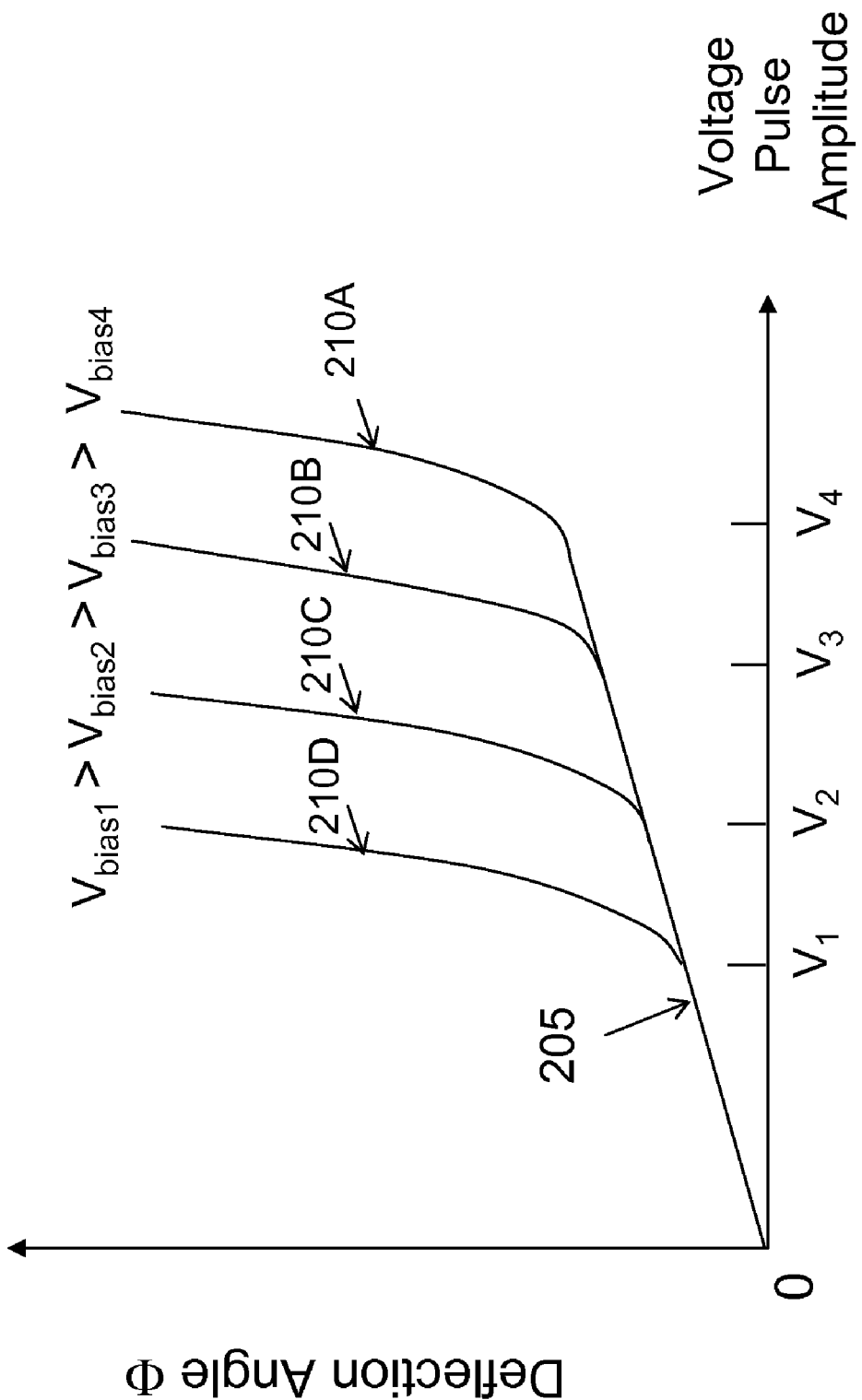
FIG. 4 illustrates the deflection angle of a low voltage MEMS device as a function of the addressing voltage at different bias voltages.

FIG. 4 illustrates the deflection angle "Φ" of the cantilever 114A as a function of the addressing voltage at different bias voltages $V_{bias1}$, $V_{bias2}$, $V_{bias3}$, and $V_{bias4}$, wherein $V_{bias1} > V_{bias2} > V_{bias3} > V_{bias4}$. For each of the bias voltages $V_{bias1}$, $V_{bias2}$, $V_{bias3}$, and $V_{bias4}$, the deflection angle "Φ" initially increases at a low rate as a function of the addressing voltage following the deflection response curve 205. For the bias voltage $V_{bias1}$, the rate of change in the deflection angle "Φ" as a function of the addressing voltage follows a more rapidly increasing deflection response curve 210D when the addressing voltage exceeds an actuation addressing voltage $V_1$. Similarly, the rates of change in deflection angles "Φ" respectively switch to more rapidly increasing deflection response curves 210A-210C when the addressing voltage exceeds actuation addressing voltage $V_2$ through $V_4$, respectively. That is, the higher the bias voltage, the lower the actuation addressing voltage required to rapidly deflect the cantilever. For example, the actuation addressing voltage $V_1$ is the lowest for the highest bias voltage $V_{bias1}$ among $V_1$-$V_4$. In other words, it takes a lower-amplitude voltage pulse to actuate the cantilever 114A at a higher bias voltage.

Figure 5:
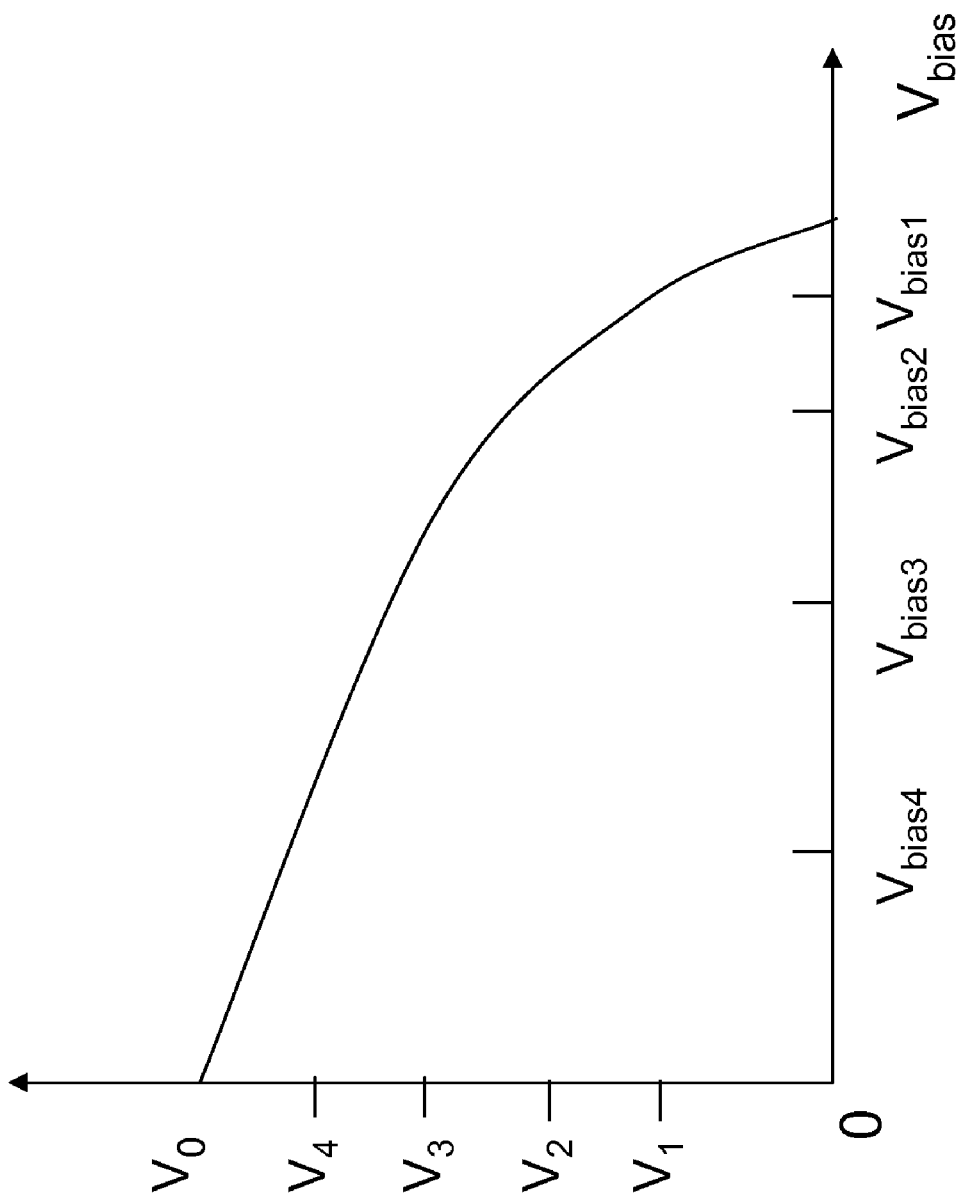
FIG. 5 illustrates the addressing voltage required to actuate the low voltage MEMS device as a function of the bias voltage.

FIG. 5 illustrates the dependence of the actuation addressing voltage on the bias voltage. The actuation addressing voltage is the actuation addressing voltage required to actuate the low voltage MEMS device 110A. The actuation addressing voltage $V_0$ corresponds to the situation when no bias voltage is applied, as shown in FIG. 3. The actuation addressing voltages $V_1$, $V_2$, $V_3$, and $V_4$ respectively correspond to situations in which bias voltages $V_{bias1}$, $V_{bias2}$, $V_{bias3}$, and $V_{bias4}$ are applied to the cantilever 114A and the mechanical stop 116A. As described previously, the actuation addressing voltage decreases as a function the bias voltage. The decreased actuation address voltage can reduce the required peak voltage of the electric pulse applied to actuate the cantilever 114A, which can reduce the requirements and the costs in the driving circuit for generating the addressing voltage pulses.

Figure 6:
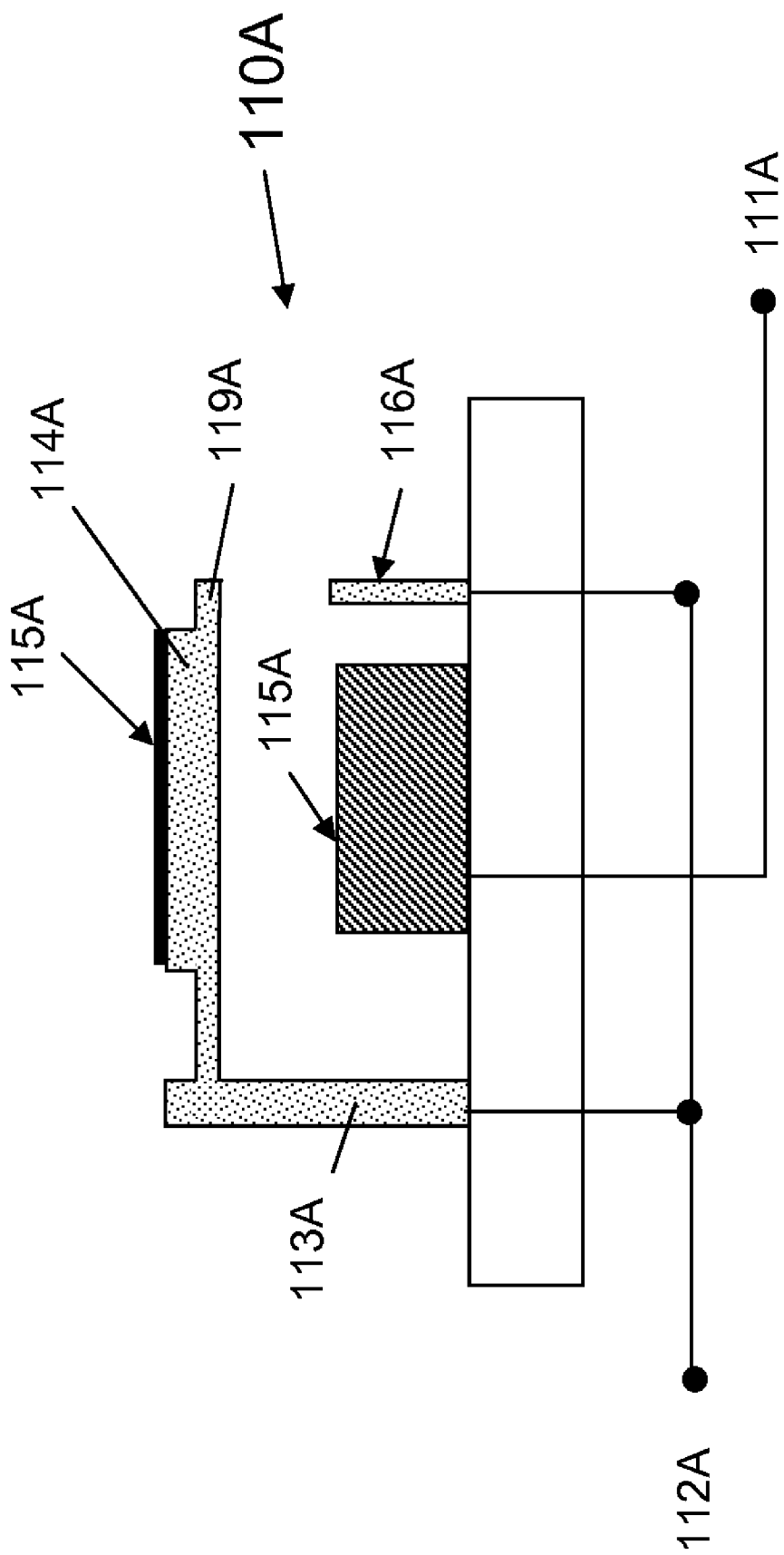
FIG. 6 illustrates a cross-sectional view of another implementation of the low voltage MEMS device in the apparatus of FIG. 1.

FIG. 6 illustrates a cross-sectional view of another implementation of the low voltage MEMS device 110A of the apparatus 100. In contrast to configuration shown in FIG. 2A, the electrode 115A is electrically connected with the word line $N_1$ via the interconnect 111A. The post 113A and the mechanical stop 116A are electrically connected with the bit line $M_1$ via the electric interconnect 112A. The mechanical stop 116A is kept at substantially the same electric potential as the conductive portion of the cantilever 114A such that the electric potential of the cantilever 114A can be maintained when it is bent to contact the mechanical stop 116A.

Figure 7:
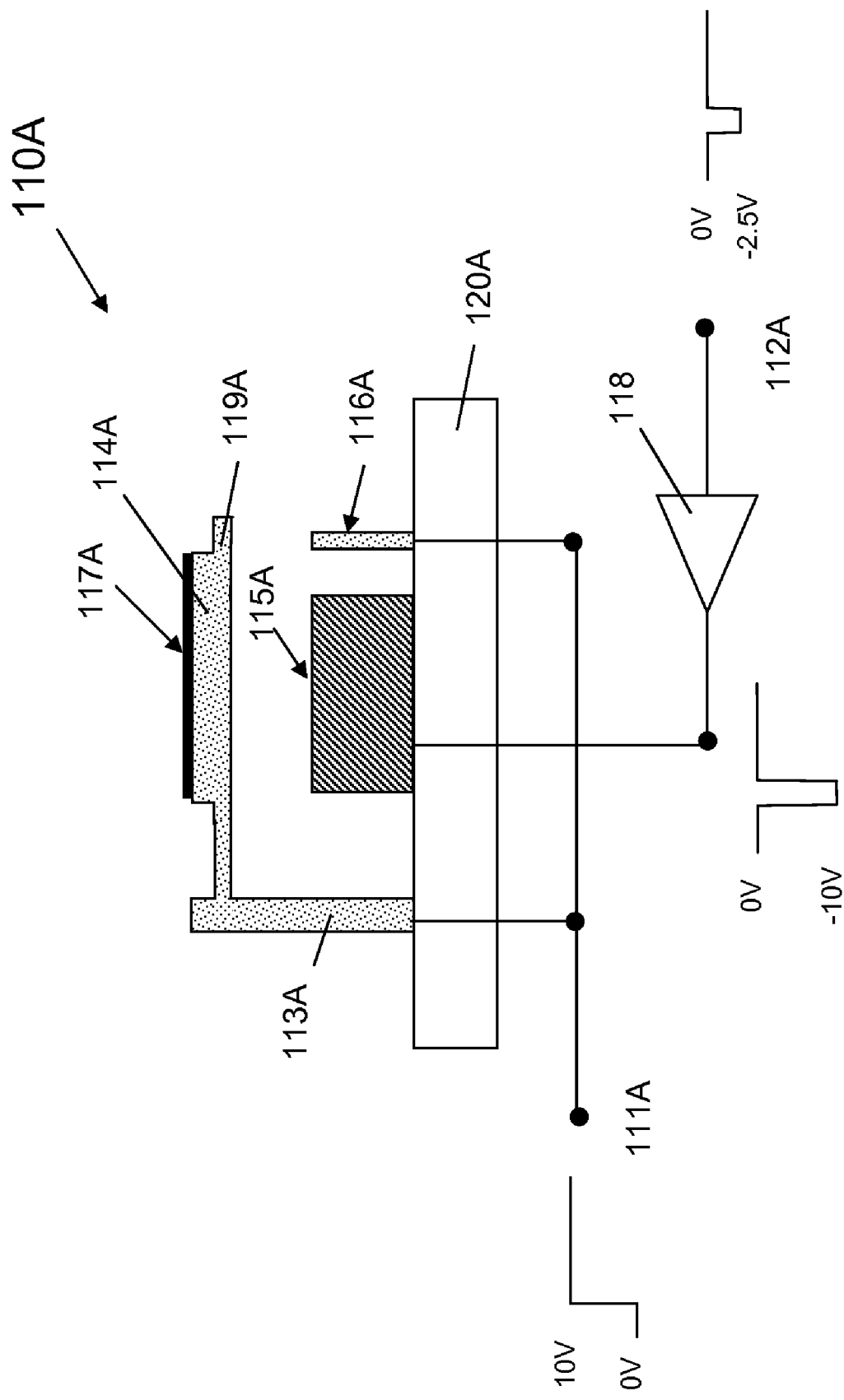
FIG. 7 illustrates a cross-sectional view of another exemplified low voltage MEMS device for the apparatus of FIG. 1.

FIG. 7 shows an active low-voltage MEMS device that is suitable for the low voltage MEMS device 110A in the apparatus 100. An amplifier 118 can receive a low-voltage voltage signal (e.g., a −2.5 V voltage pulse) from the electric interconnect 112A and send an amplified voltage signal (e.g., a −10V voltage pulse) to the electrode 115A. The amplifier 118 can include one or more transistors. The advantage of the active low-voltage MEMS device is that low voltage signals can be applied to the bit lines $M_1$ through $M_i$ in apparatus 100. The low-voltage MEMS device can be driven at a higher response rate because it normally takes less time to build up a lower voltage in an electric device than a higher voltage in the same electric device. Moreover, the low voltage signals can also reduce the electronic interference between the bit lines $M_1$ or $M_i$ produced by the driving voltage signals.

Figure 8A:
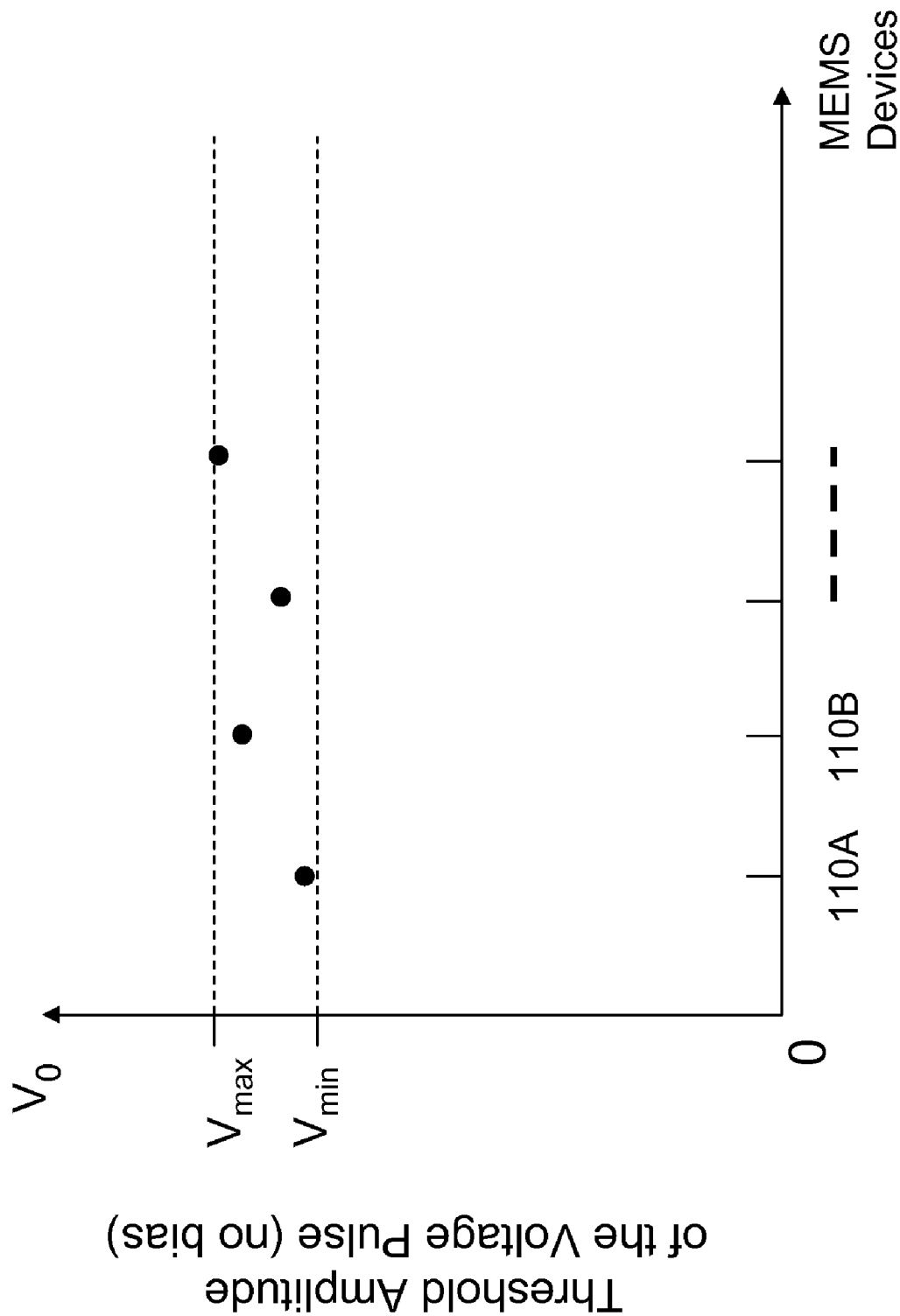
FIG. 8A illustrates the variability in the actuation addressing voltages of the MEMS devices in an apparatus.

In another aspect, the bias voltage produced by the bias circuit 120 can be selected to compensate for the variability in the low-voltage MEMS devices 110A, 110B. Variability in the properties of the MEMS devices is inherent in an apparatus. For example, the variability can be caused by the non-uniform processing conditions in the fabrication of the MEMS devices in the apparatus. FIG. 8A illustrates that the actuation addressing voltages $V_0$ of the MEMS devices 110A, 110B in the apparatus 100 in the absence of a bias voltage can vary in a range defined by $V_{max}$ and $V_{min}$. In a real apparatus, the range of the variability can be a small fraction of the absolute values of the addressing actuation voltage. For example, $V_{max}-V_{min}$ can be 5% or 10% of the average actuation addressing voltage in the apparatus 100. In other words, it takes slightly different actuation addressing voltages to actuate the low-voltage MEMS devices 110A, 110B in the apparatus 100.

The bias voltage ought to be selected such that all the low-voltage MEMS devices 110A, 110B in the apparatus 100 can be properly addressed and actuated by the actuation voltage signals, regardless of the variability in the properties of the MEMS devices 110A, 110B. The addressing voltage for all MEMS in the apparatus 100 can be selected to actuate the MEMS device that requires the maximum actuation addressing voltage $V_{max}$.

Figure 8B:
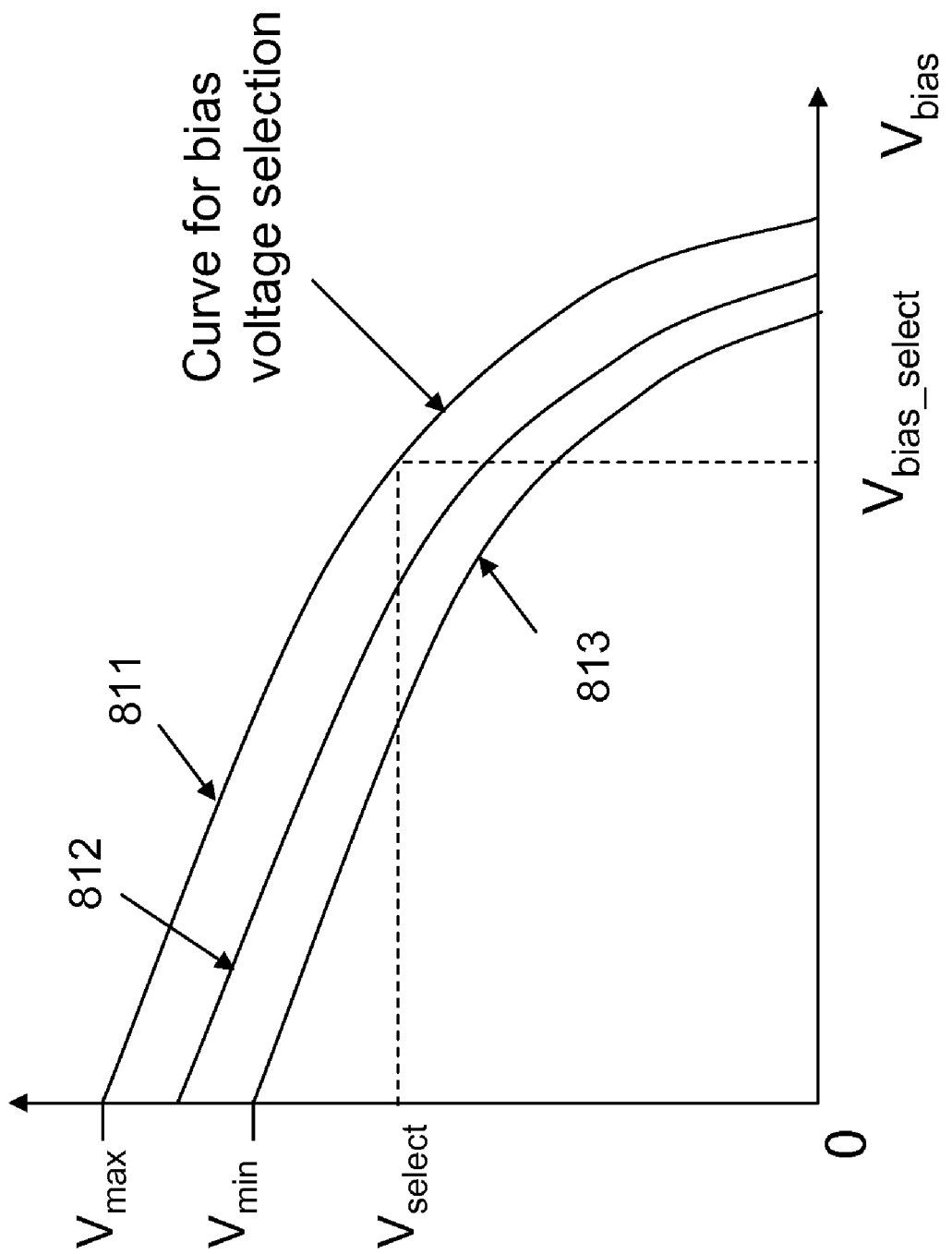
FIG. 8B illustrates the selection of the bias voltage to compensate for the variability in the actuation addressing voltages in the MEMS devices as shown in FIG. 8A.

FIG. 8B illustrates the bias voltages required to actuate the MEMS devices in the apparatus 100. A plurality of curves 811-813 each show the dependence of the actuation addressing voltage on the bias voltage for each low voltage MEMS device 110A, 110B. The curve 811 corresponds to the low voltage MEMS device that requires the maximum actuation addressing voltage at zero bias. The curve 813 corresponds to the low voltage MEMS device that requires the minimum actuation addressing voltage at zero bias. As discussed above, the bias voltage for the bias circuit 120 should be selected using curve 811. For example, if the actuation addressing voltage for the addressing signal is set to be at $V_{select}$, the bias voltage can be selected at a predetermined voltage value (such as 0.1 V, 0.5 V, 1 V, 2 V, 5 V, 7 V, 10 V, 12 V, 15 V) above $V_{bias\_select}$ to provide a safety margin for the drift in the actuation properties of the MEMS devices 110A, 110B during usage. The bias voltage for the bias circuit 120 can also be selected at a predetermined percentage, such as about 1%, 5% or 10% above $V_{bias\_select}$.

Similarly, an optimum addressing voltage can be selected at a fixed bias voltage using the curve 811. For example, when the bias voltage is set at $V_{bias\_select}$, the optimum addressing voltage for the apparatus 100 can be selected at $V_{select}$ or a predetermined value above $V_{select}$.

The selected bias voltage and the amplitude of the voltage pulse can be stored in the memory 130. The values for the selected bias voltage and the amplitude of the voltage pulse can be retrieved from the memory 130 in the field to allow the apparatus 100 operate using these values. The selection and the setting of the optimum bias voltage and the threshold amplitude of the voltage pulse can be conducted in a factory or in the field as part of the device calibration.

Figure 9:
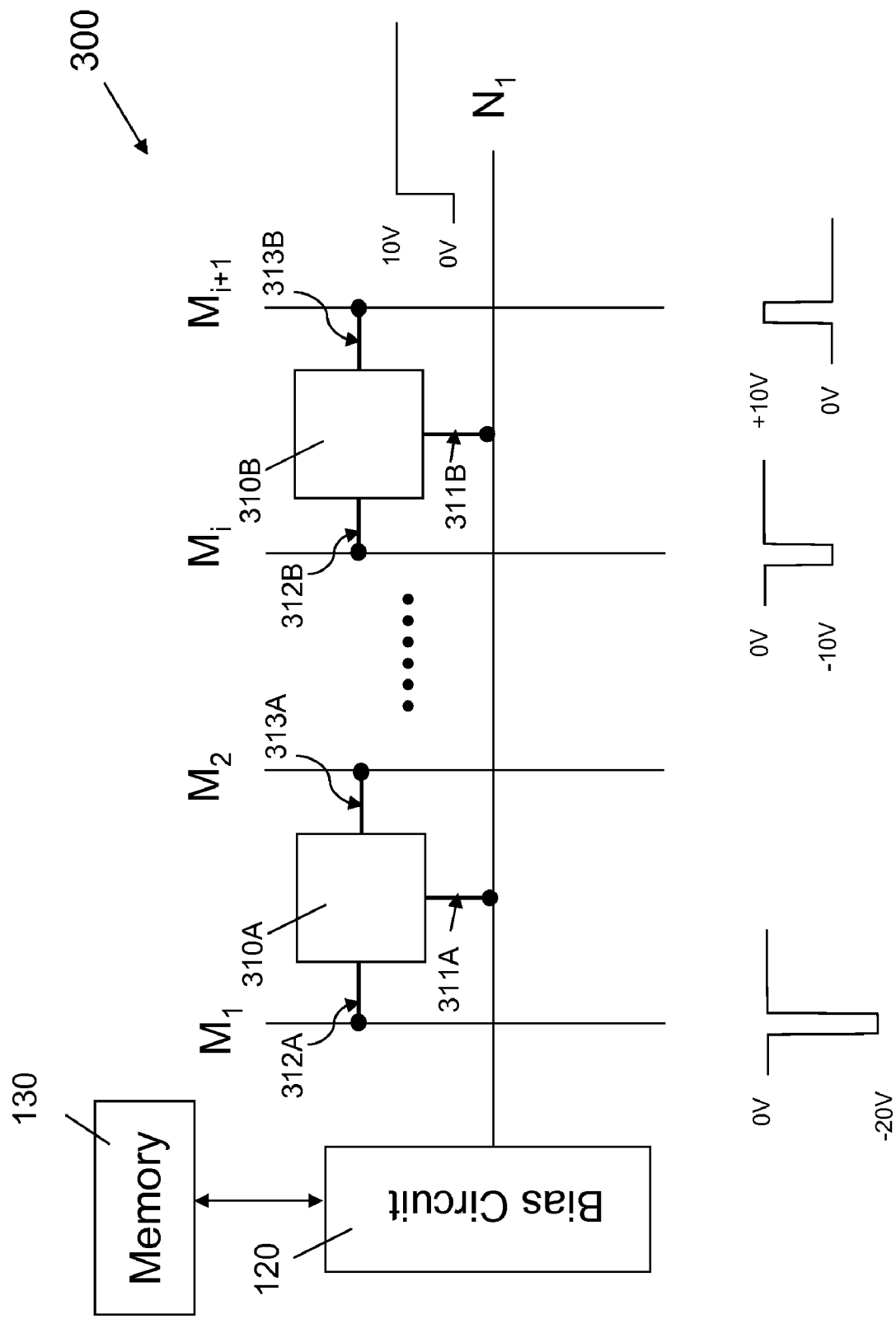
FIG. 9 illustrates a connection diagram of a spatial light modulator comprising a plurality of low voltage tiltable micro mirrors.

FIG. 9 illustrates a connection diagram for a spatial light modulator 300 comprising a plurality of low voltage tiltable micro mirrors 310A-310B. Each low voltage tiltable micro mirror 310A-310B is connected with a word line $N_1$ through the electric interconnects 311A-311B. Each low voltage tiltable micro mirror 310A-310B is also connected with two bit lines $M_1$ and $M_2$, or $M_i$ and $M_{i+1}$ respectively through the electric interconnects 312A-312B and 313A-313B such that the low voltage tiltable micro mirrors 310A-310B can be tilted by electrostatic forces about an axis in clockwise and counter clockwise directions. The spatial light modulator 300 also includes a bias circuit 120 that can provide bias voltages to the word lines $N_1$.

A positive bias voltage can be applied to the word line $N_1$ and negative voltage pulses can be selectively applied to the bit lines $M_2$, $M_2$, $M_i$ or $M_{i+1}$. For example, a low voltage tiltable micro mirror 310A can be driven by a −20V voltage pulse at the bit line $M_1$ when a +10V bias voltage is applied to the wordline $N_1$. In should be noted that many schemes of driving voltages can be compatible with devices described in the present specification. For example, the bias voltage can be negative and the voltage pulses can be positive. In another example, the low voltage tiltable micro mirror 310A can be driven by a −10V voltage pulse at the bit line $M_i$ and a simultaneous +10V voltage pulse at the bit line $M_{i+1}$ when a +10V bias voltage is applied to the wordline $N_1$. Similar to the circuit in FIG. 7, the low voltage tiltable micro mirror 310A can include one or more amplifiers or transistors such that the low voltage tiltable micro mirror 310A can receive low voltage pulses from the bit lines and locally amplify the low voltage pulses for driving the tiltable mirror plate.

Figure 10:
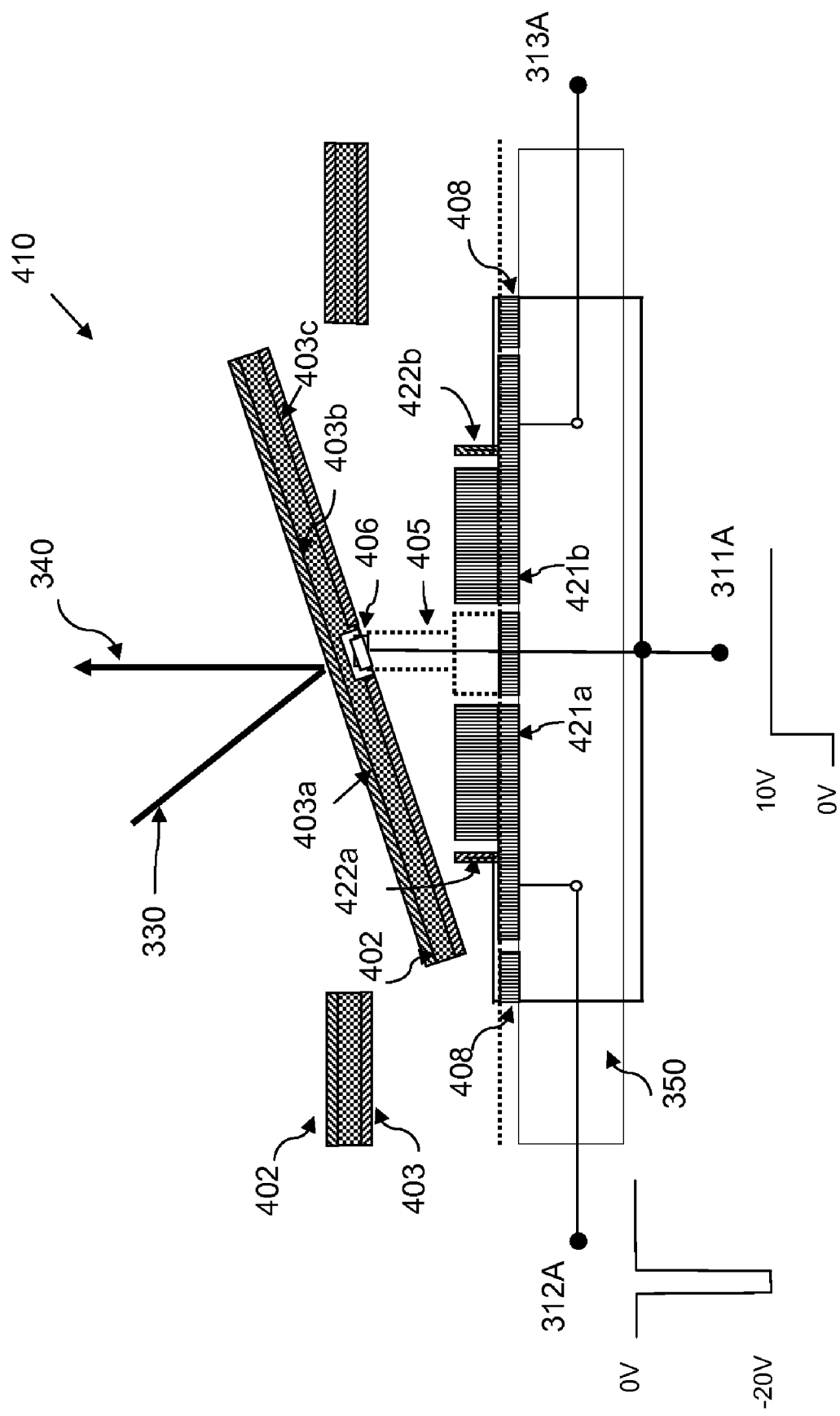
FIG. 10 illustrates a cross-sectional view of the low voltage tiltable micro mirror in the spatial light modulator of FIG. 9.

FIG. 10 shows a cross-sectional view of an exemplified low voltage tiltable micro mirror 410 that is compatible with the low voltage tiltable micro mirrors 310A-310B in the spatial light modulator 300. The low voltage tiltable micro mirror 410 includes a mirror plate 402 having a flat reflective upper layer 403a that provides the mirror surface, a middle layer 403b that provides the mechanical strength for the mirror plate, and a bottom layer 403c. The reflective upper layer 403a can be formed by a thin layer of a metallic material such as aluminum, silver, or gold with a layer thickness in the range of about 200 to 1000 angstroms, such as about 600 angstroms. The middle layer 403b can be made of a silicon based material such as amorphous silicon having a thickness in the range from about 2000 to about 5000 angstroms. The bottom layer 403c can be made of an electrically conductive material that allows the electric potential of the bottom layer 403c to be controlled relative to the step electrodes 421a or 421b. For example, the bottom layer 403c can be made of titanium and have a thickness in the range of about 200 to 1000 angstrom.

The mirror plate 402 includes one or two hinges 406 that are connected with the bottom layer 403c (the connections are out of plane of view and are thus not shown in FIG. 10) and are supported by a hinge support post 405 (shown in phantom) that is rigidly connected to a substrate 350. The mirror plate 402 can include two hinges 406 connected to the bottom layer 403c. Each hinge 406 defines a pivot point for the tilt movement of the mirror plate 402. The two hinges 406 can define an axis about which the mirror plate 402 can be tilted. The hinges 406 extend into cavities in the lower portion of mirror plate 402. For ease of manufacturing, the hinge 406 can be fabricated as part of the bottom layer 403c.

Step electrodes 421a and 421b, landing tips 422a and 422b, and a support frame 408 can also be fabricated over the substrate 350. The heights of the step electrodes 421a and 421b can be in the range from about 0.2 microns to 3 microns. The electric potentials of the step electrodes 421a and 421b can be independently controlled by external electrical signals. The step electrode 421a is electrically connected to the electrical interconnect 312A that is connected with the bit line $M_1$. The step electrode 421b is electrically connected with the electrical interconnect 313A that is connected with the bit line $M_2$. The bottom layer 403c of the mirror plate 402 and the landing tips 422a and 422b are connected with the electrical interconnect 311A. The electrical interconnect 311A is connected to the word line $N_1$ and receive a bias voltage from the bias circuit 120.

The low voltage tiltable micro mirror 410 can be selectively tilted by a negative voltage pulse applied to the electrical interconnects 312A and a positive bias voltage applied to the electrical interconnects 311A. An electrostatic force is produced on the mirror plate 402 by the negative electrical voltage pulse and the bias voltage. An imbalance between the electrostatic forces on the two sides of the mirror plate 402 can cause the mirror plate 402 to tilt toward the step electrode 421a until it is stopped by the landing tip 422a. When the mirror plate 402 is tilted to the "on" position as shown in FIG. 10, the flat reflective upper layer 403a reflects incident light 330 to produce reflected light 340 along the "on" direction. The incident light 330 is reflected to the "off" direction when the mirror plate 402 is tilted to the "off" position.

The landing tips 422a and 422b can have a same height as that of a second step in the step electrodes 421a and 421b for manufacturing simplicity. The landing tips 422a and 422b provide a gentle mechanical stop for the mirror plate 402 after each tilt movement. The landing tips 422a and 422b can stop the mirror plate 402 at a precise tilt angles. Additionally, the landing tips 422a and 422b can store elastic strain energy when they are deformed by electrostatic forces and convert the elastic strain energy to kinetic energy to push away the mirror plate 402 when the electrostatic forces are removed. The push-back on the mirror plate 402 can help separate the mirror plate 402 and the landing tips 422a and 422b.

Each of the low voltage tiltable micro mirrors 310A-310B in the spatial light modulator 300 can be selectively addressed and actuated by a combination of the bias voltage and voltage pulses selectively applied to the word lines and the bit lines. The low voltage tiltable micro mirrors 310A-310B can be selectively tilted to "on" or "off" positions to reflect light in an "on" direction and an "off" direction. The light reflected in the "on" direction can form a display image. A video image clip includes a series of image frames each of which is displayed for a frame time. The bias voltages applied to the low voltage tiltable micro mirrors are typically kept substantially constant through many image frames. For example, the bias voltages applied to the low voltage tiltable micro mirrors can stay substantially constant through a full video clip or as long as the spatial light modulator 300 is powered up. In comparison, the addressing voltage pulses typically have pulse widths substantially narrower than the frame time of video images. For example, for video images at 60 Hz (or 16.7 ms frame time), the voltage pulses may have pulse widths in the range 1 µs to 5 ms. In other words, the duration of the bias voltage can encompass a plurality of the voltage pulses. In some embodiments, the duration of the bias voltage is more than ten frame times. The width of the voltage pulse is less than half of the frame time. In some embodiments, the duration of the bias voltage is more than a hundred frame times. The width of the voltage pulse is less than half of the frame time.

The voltage signal that actuates the low-voltage tiltable micro mirrors may include a plurality of voltage pulses. As described above, the voltages pulses can have a polarity opposite to the polarity of the bias voltage. Furthermore, some of the actuation pulses may have the same polarity as the polarity of the bias voltage. If the polarity of the pulse is the same as the polarity of the bias voltage and is approximately the same voltage, the electrostatic forces on either side of the mirror plate are reduced, which reduces the attraction between the mirror plate and the electrodes, allowing the mirror plate to tilt away from the step electrodes 421a or 421b.

Referring back to FIG. 9, the tiltable micro mirrors 310B and 310B are respectively addressed with positive bias voltages via the wordline $N_1$. A bias voltage can be applied to the bottom layer 403c of the mirror plate 402 and the landing tips 421a and 421b. A negative voltage pulse is applied to the bit line $M_i$ and the step electrode 421a. A positive voltage pulse is applied to the bit line $M_{i+1}$ and the step electrode 421b. The two voltage pulses applied help to create a stronger attractive electrostatic force on the mirror plate 402 on the side from the step electrode 421a than on the mirror plate 402 on the side of the step electrode 421b. relative attractive forces, not repulsive It is understood that the above described system and methods can include many variations without deviating from the spirit of the present specification. For example, the actuation addressing the voltages and the bias voltages can vary in accordance to the specific dimensions and the physical properties of each low-voltage MEMS device. In addition to the micro mirrors and the cantilever described above, the above described system and methods are compatible with a wide range of micro mechanical devices such as actuators, and micro vibrators.

What is claimed is:

1. An apparatus, comprising:
a plurality of micro-mechanical devices, each comprising:
    a first structure portion over a substrate;
    a second structure portion connected to the first structure portion, wherein the second structure portion comprises a conductive portion and is configured to move in response to a voltage pulse and a bias voltage; and
    an electrode over the substrate and under the conductive portion of the second structure portion;
a first electric circuit configured to apply the voltage pulse having a pulse amplitude either to the electrode or the second structure portion of at least one micro-mechanical device of the plurality of micro-mechanical devices; and
a second electric circuit configured to apply the bias voltage to the plurality of micro-mechanical devices, wherein the bias voltage is applied to whichever of the electrode or the second structure portion of the at least one micro-mechanical device does not have the voltage pulse applied thereto in the step of applying the voltage pulse;
wherein at least two micro-mechanical devices of the plurality of micro-mechanical devices have different threshold amplitudes, each threshold amplitude being a minimum voltage of the voltage pulse required to move the second structure portion in conjunction with the bias voltage and the bias voltage and the voltage pulse having the pulse amplitude are capable of moving the second structure portion of the micro-mechanical device that has the higher threshold amplitude of the different threshold amplitudes.

2. The apparatus of claim 1, wherein the pulse amplitude is selected to be between the higher threshold voltage and 10 V or 50% higher than the higher threshold amplitude.

3. The apparatus of claim 1, wherein the first electric circuit is configured to apply the bias voltage to the conductive portion of the second structure portion and the second electric circuit is configured to apply the voltage pulse to the electrode in the at least one micro-mechanical device.

4. The apparatus of claim 1, wherein the first electric circuit is configured to apply the bias voltage to the electrode and the second electric circuit is configured to apply the voltage pulse to the conductive portion of the second structure portion in the at least one micro-mechanical device.

5. The apparatus of claim 1, wherein the bias voltage has a first electric polarity and the voltage pulse has a second electric polarity opposite to the first electric polarity.

6. The apparatus of claim 1, wherein the bias voltage and at least a portion of the voltage pulse have the same electric polarity.

7. The apparatus of claim 1, wherein the bias voltage has a duration that encompasses a plurality of the voltage pulses.

8. The apparatus of claim 1, further comprising a mechanical stop configured to contact the second structure portion to stop the movement of the second structure portion.

9. The apparatus of claim 1, wherein the second structure portion comprises a reflective upper surface.

10. The apparatus of claim 1, further comprising a memory device connected to the first electric circuit and the second electric circuit, wherein the memory device is configured to store the bias voltage and the amplitude of the voltage pulse.

11. A method for driving a plurality of micro-mechanical devices in an apparatus, comprising:
applying a voltage pulse having a pulse amplitude either to an electrode or a first structure portion of at least one micro-mechanical device of the plurality of micro-mechanical devices, wherein the first structure portion is connected to a second structure portion on a substrate and the electrode is on the substrate underneath the first structure portion; and
applying a bias voltage to the plurality of micro-mechanical devices, wherein the bias voltage is applied to whichever of the electrode or the first structure portion of the at least one micro-mechanical device does not have the voltage pulse applied thereto in the step of applying the voltage pulse;
wherein at least two micro-mechanical devices of the plurality of micro-mechanical devices have different threshold amplitudes, each threshold amplitude being a minimum voltage of the voltage pulse required to move the first structure portion in conjunction with the bias voltage and the bias voltage and the voltage pulse having the pulse amplitude are capable of moving the first structure portion of the micro-mechanical device that has the higher threshold amplitude of the different threshold amplitudes.

12. The method of claim 11, further comprising moving at least a portion of the first structure portion of the micro-mechanical device in response to the voltage pulse and the bias voltage.

13. The method of claim 11, wherein the pulse amplitude is selected to be between the higher threshold amplitude and 10 V, or 50% higher than the higher threshold amplitude.

14. The method of claim 11, wherein the bias voltage is applied to the first structure portion and the voltage pulse is applied to the electrode.

15. The method of claim 11, wherein the bias voltage is applied to the electrode and the voltage pulse is applied to the first structure portion.

16. The method of claim 11, wherein the bias voltage has a first polarity and the voltage pulse has a second polarity opposite to the first polarity.

17. The method of claim 11, wherein the bias voltage and the voltage pulse have a same polarity.

18. The method of claim 11, further comprising stopping the movement of the first structure portion with a mechanical stop on the substrate.

19. The method of claim 11, wherein the first structure portion comprises a lower conductive surface.

20. The method of claim 11, wherein the first structure portion comprises a reflective upper surface.

21. A method for selecting a bias voltage for addressing an array of micro-mechanical devices, comprising:
applying a voltage pulse either to an electrode or to a first structure portion of at least one micro-mechanical device, wherein the first structure portion is connected to a second structure portion on a substrate and the electrode is on the substrate underneath the first structure portion;
applying a bias voltage to whichever of the electrode or the first structure portion of the micro-mechanical device does not have the voltage pulse applied thereto in the step of applying the voltage pulse;
varying the bias voltage to determine a threshold bias voltage of the micro-mechanical device, the threshold bias voltage being a minimum bias voltage that causes the movement of the first structure portion of the micro-mechanical device in conjunction with the applied voltage pulse;
repeating the varying step for each of the micro-mechanical devices to determine threshold bias voltages for each of the micro-mechanical devices in the array; and
selecting an addressing voltage for the bias voltage about equal to or at a predetermined value above the maximum threshold bias voltage of the threshold bias voltages for the micro-mechanical devices.

22. The method of claim 21, wherein the addressing voltage is within 1%, 5%, 10%, 20%, 40%, 50%, 0.1 V, 0.5 V, 1 V, 2 V, 5 V, 10 V or 15 V of the threshold bias voltage.

23. The method of claim 21, wherein the predetermined value is 1%, 5%, 10%, 20%, 30%, 50%, 0.1 V, 0.5 V, 1 V, 2 V, 5 V, 10 V or 15 V above the maximum threshold bias voltage.

24. The method of claim 21, wherein the micro-mechanical devices comprise all the micro-mechanical devices in the array.

25. The method of claim 21, wherein the bias voltage is applied to the first structure portion and the voltage pulse is applied to the electrode.

26. The method of claim 21, wherein the bias voltage is applied to the electrode and the voltage pulse is applied to the first structure portion.

27. The method of claim 21, wherein the bias voltage has a first polarity and the voltage pulse has a second polarity opposite to the first polarity.

28. The method of claim 21, wherein the bias voltage and the voltage pulse have a same polarity.

29. The method of claim 21, wherein the first structure portion comprises a lower conductive surface.

30. The method of claim 21, wherein the first structure portion comprises a reflective upper surface.

31. A method for selecting an amplitude for a voltage pulse for addressing an array of micro-mechanical devices, comprising:
applying a bias voltage either to an electrode or to a first structure portion of at least one micro-mechanical device of the array of micro-mechanical devices, wherein the first structure portion is connected to a second structure portion on a substrate and the electrode is on the substrate underneath the first structure portion;
applying a voltage pulse to whichever of the electrode or the first structure portion of the micro-mechanical device does not have the bias voltage applied thereto in the step of applying the bias voltage;
varying the amplitude of the voltage pulse to determine a threshold amplitude of the voltage pulse, the threshold amplitude being a minimum voltage of the voltage pulse that causes the movement of at least a portion of the first structure portion of the micro-mechanical device in conjunction with the applied bias voltage;

repeating the varying step for each of the micro-mechanical devices to determine a threshold amplitude of the voltage pulse for each micro-mechanical device in the array; and selecting an addressing amplitude for the voltage pulse that is a predetermined value above a maximum threshold amplitude of the voltage pulse for the micro-mechanical devices.

32. The method of claim 31, wherein the addressing amplitude is within 1%, 5%, 10%, 20%, 40%, 50%, 0.1 V, 0.5 V, 1 V, 2 V, 5 V, 10 V or 15 V of the threshold amplitude.

33. The method of claim 31, wherein the predetermined value is 1%, 5%, 10%, 20%, 40%, 50%, 0.1 V, 0.5 V, 1 V, 2 V, 5 V, 10 V or 15 V above the maximum threshold amplitude of the voltage pulse.

34. The method of claim 31, wherein the plurality of micro-mechanical devices comprise all the micro-mechanical devices in the array.

* * * * *